FLEXION-TYPE SYMMETRICAL OSCILLATOR

Filed June 6, 1969 2 Sheets-Sheet 1

Dec. 22, 1970 R. CHOPARD ET AL 3,548,585

FLEXION-TYPE SYMMETRICAL OSCILLATOR

Filed June 6, 1969

2 Sheets-Sheet 2

United States Patent Office 3,548,585

Patented Dec. 22, 1970

3,548,585
FLEXION-TYPE SYMMETRICAL OSCILLATOR

Remy Chopard, Neuchatel, and Heinrich Stamm, Grenchen, Switzerland, assignors to Ebauches S.A., Neuchatel, Switzerland

Continuation-in-part of abandoned application Ser. No. 547,817, May 5, 1966. This application June 6, 1969, Ser. No. 831,110
Claims priority, application Switzerland, May 28, 1965, 7,571/65
Int. Cl. G04c *3/00*
U.S. Cl. 58—23 11 Claims

ABSTRACT OF THE DISCLOSURE

A flexure-type symmetrical oscillator for an electric timepiece, having a U-shaped port with two flexible limbs connected at their free ends to two rigid arms which in turn have counter-balancing masses at their free ends and drive transducers at the location where they are connected to the flexible limbs, the dimensioning of the arms and limbs being such that the instanteous center of rotation thereof is substantially coincident with the center of gravity during fllexure, whereby the frequency of the oscillator is substantially independent of changes of position and orientation of the oscillator with respect to gravity.

CROSS-RELATED APPLICATION

This application is a continuation-in-part of our earlier application Ser. No. 547,817 filed May 5, 1966 which is now abandoned and claiming the priority of our application filed in Switzerland on May 28, 1965.

BRIEF SUMMARY OF THE INVENTION

The present invention relates to a flexure-type symmetrical oscillator, particularly for an electric timepiece.

Electric timepieces are known in which the conventional oscillator, with a balance and balance spring, is replaced by an electro-mechanical oscillator of a different type, more especially the flexure type, such as a tuning fork for example, or the torsion type.

An oscillator used in electric timepieces should fulfill the following conditions:

(1) Its frequency should be less than 2000 cycles per second, so that further division of said frequency may be realizable by simple mechanical means.

(2 It should possess an excess tension factor Q that is as high as possible, so that good frequency stability is ensured.

(3) The dissipation of energy in the support in which the oscillator is mounted should be as small as possible, so that the oscillator is affected as little as possible by its mounting.

(4) It should be as insentitive as possible to changes of position or orientation in the field of gravity so that variation of the frequency of oscillation as a function of the position or orientation of the oscillator in the field of gravity should be as small as possible, and ideally zero.

(5) Its thermal compensation should be as effective as possible.

(6) Its thickness and surface dimensions should be compatible with the generally small dimensions of timepieces.

(7) Its manufacture should be as simple as possible in order to reduce cost price while retaining maximum accuracy.

The object of the invention is to provide an oscillator that can fulfill these various conditions.

The oscillator according to the invention comprises a

U-shaped part having two flexible limbs adapted to participate in flexure in the fashion of a tuning fork, and two rigid arms serving as counterbalances for the flexible limbs during flexure, one such rigid arm being connected to each of the flexible limbs at or adjacent the free end of the latter, the arrangement being such that, for each of the two symmetrical parts of said oscillator, the instantaneous center of rotation thereof is substantially coincident with the center of gravity thereof during flexure, whereby the frequency of the oscillator is substantially independent of changes of position and orientation of such oscillator with respect to the field of gravity.

DETAILED DESCRIPTION

Figure 1:
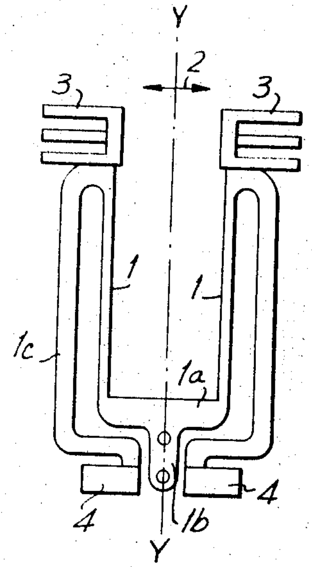
FIG. 1 is a plan view of a first embodiment of a symmetrical oscillator of flexure type for a timepiece.
Figure 2:
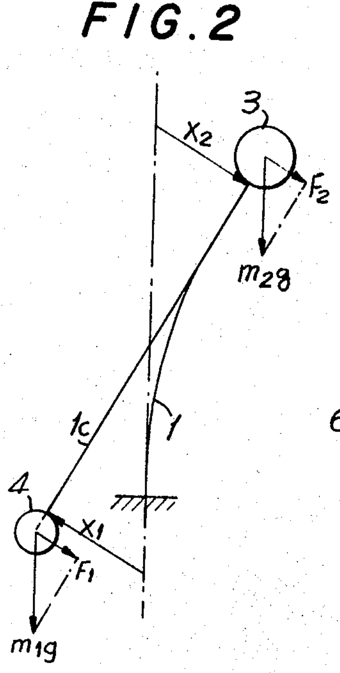
FIG. 2 is a diagrammatic view of one of the symmetrical portions of the oscillator of FIG. 1, shown in the course of oscillating.

The oscillator shown in FIGS. 1 and 2 comprises a U-shaped member constituted by two flexible and parallel limbs 1, joined by a rigid transverse cross-piece 1*a*. A lug 1*b* extends from cross-piece 1*a* and serves for attachment of the oscillator to its support (not shown). The two flexible limbs 1 are intended to oscillate in the direction of the arrow 2 in the fashion of a tuning fork.

Each limb 1 is integrally formed at its end remote from the cross-piece 1*a* (hereinafter termed its free end) with a rigid arm 1*c* that extends back towards the cross-piece 1*a*. The rigid arms 1*c* constitute counter-balances the purpose of which will be shown hereinafter.

Each limb 1 carries, at its free end, a unit 3 which forms a part of an electro-dynamic transducer (not shown in detail since its does not form part of the present invention) adapted to maintain the oscillations of the oscillator. The free ends of the rigid arms 1*c* carry counterbalances 4. The units 3 are attached to the limbs 1 by brazing or by adhesive means, as are the counterbalances 4 to the ends of the arms 1*c*.

In order that the oscillator frequency should be insensitive to changes of position or orientation in the field of gravity, the arrangement is such that, for each of the parts of the oscillator that are located on one or the other side of its axis of symmetry Y—Y, the instantaneous center of rotation and the center of gravity coincide. This is mathematically expressed by the relation $$F_1X_1-F_2X_2=0$$

which means that the sum of the linear momentums of the disturbing forces is equal to zero, the forces being proportional to the masses and the amplitudes to the distances from the masses to the centers of rotation. Moreover, the above condition is satisfied irrespective of the orientation of the oscillator with respect to the direction of gravitational acceleration *g*, where F2 is the component perpendicular to the flexible arm 1 of the gravity force *mg*, acting on the unit 3, $X_2$ is the amplitude of the displacement of the unit 3, $F_1$ is the component perpendicular to the arm 1 of the gravity force $m_1g$ acting on the counterbalance 4, and X1 is the amplitude of the displacement of the latter. (The mass of the limb 1 and that of the arm 1*c* have been considered to be negligible, in order to make the explanation clear.)

The products $F_1X_1$ and $F_2X_2$ are differing signs since the component $F_1$ is of opposite sign to $X_1$.

Thus, when the oscillator is arranged in such a way as to satisfy the above relation, $F_1X_1-F_2X_2=0$, the error in position of the oscillator parts, due to the effect of gravity, is zero, and the variation for the oscillator frequency is also zero.

In the forms of embodiment in FIGS. 3 to 6 the oscillating portion of each of the oscillators described and shown and their "counterbalancing" portions are separately formed, the latter being mounted on the former.

Figure 3:
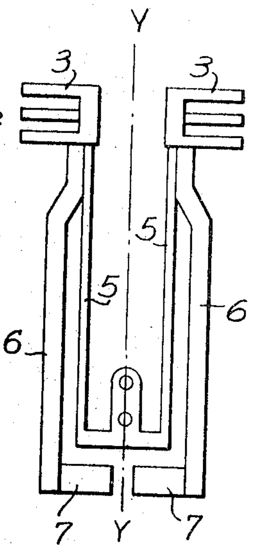
FIGS. 3 and 4 are plan views of two other embodiments of a symmetrical oscillator of the flexure type.

In the embodiment of FIG. 3, the U-shaped oscillating portion has two flexible limbs 5 at the ends of each of which is attached, for example, by brazing or by adhesive means, a rigid arm 6. Each arm 6 carries, at its free end, a counterbalance 7 brazed or fixed by adhesive means to the inner lateral face of such arm. The units 3 of the transducer, which are identical with those in the first embodiment, are brazed or fixed by adhesive means to the ends of the limbs 5 and the arms 6. The limbs 5 and the arms 6 are located in the same plane.

Figure 4:
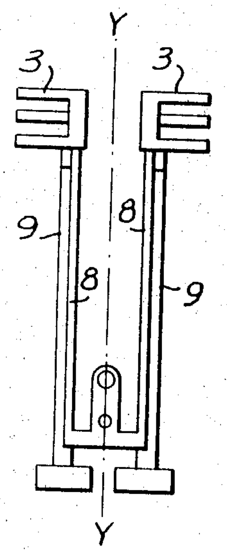
Figure 5:
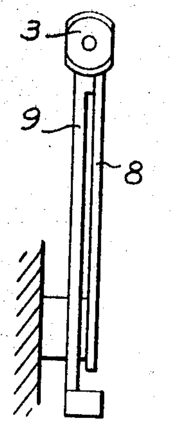
FIG. 5 is a side view of the oscillator of FIG. 4.

The embodiment of FIGS. 4 and 5 differs from that in FIG. 3 chiefly in the fact that the resilient limbs, indicated at 8, and the rigid arms, indicated at 9, likewise assembled by brazing or by adhesive means, are effectively superimposed, respectively lying in parallel planes, thus reducing the oscillator's surface measurements.

Figure 6:
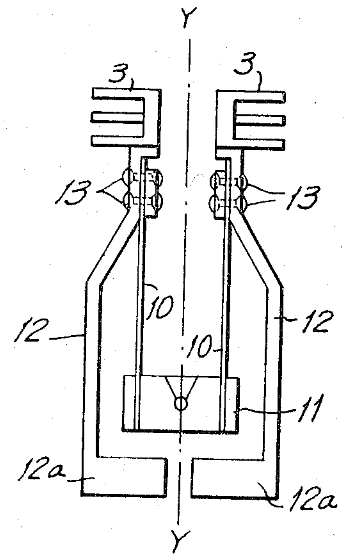
FIGS. 6, 7, 8 and 9 are plan views of four other embodiments of a symmetrical oscillator of the flexure type.

In the form of embodiment of FIG. 6, the resilient limbs are constituted by two flexible blades 10 embedded in a common support 11, and the rigid arms, indicated at 12, are riveted at 13 to the ends of the arms 10. The counterbalances, indicated at **12*a* are integrally formed with the arms 12**.

All the embodiments described and shown fulfill the conditions set out in the introduction of the present specification.

Thus, it is easy to obtain a frequency less than 2000 cycles per second (Point 1) by suitably selecting the dimensions of the transducer units and the counterbalances.

Conditions relating to the excess tension factor Q and to the dissipation of energy in the support (Points 2 and 3) are related; these conditions are satisfied for each embodiment on the one hand due to the symmetry of the oscillators in relation to the axis Y—Y and on the other hand by the fact that the mounting on the support is provided at a nodal point of the oscillator.

The independence of the frequency of the oscillator with respect to its position or irientation in the gravity field (Point 4) is satisfied, as has been shown, when the sum of the gravitational elasticities of the oscillating and of the counterbalancing part is zero.

The degree of thermal compensation of the oscillator (Point 5) depends on the selection of the alloys used in making the various parts of the oscillator. Effective thermal compensation can be achieved by a correct selection of said alloys. When the oscillating part and the counterbalancing part of the oscillator are separately formed (embodiments of FIGS. 3 to 6), it is possible to obtain thermal compensation which is extremely precise by selecting an appropriate combination of the materials respectively employed for the oscillating part and the counterbalancing part.

As regards the dimensions of the oscillator (Point 6), it will generally be found advantageous to reduce the surface dimensions at the expense of thickness, as is the case in the embodiment in FIGS. 4 and 5. In fact, in said embodiment the oscillator is particularly narrow in width, without its thickness, however, being prohibitively great, since the extra thickness arising from the fact that the flexible limbs and the rigid arms are superimposed does not exceed the thickness of the units 3 of the transducer.

Figure 7:
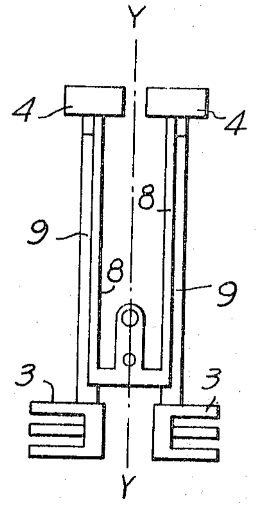

In the embodiments of FIG. 7, the units 3 each forming a part of an electro-dynamic transducer are secured to the free ends of the rigid arms 9, while the counterbalances 4 are secured to the free ends of the flexible limbs 8.

Figure 8:
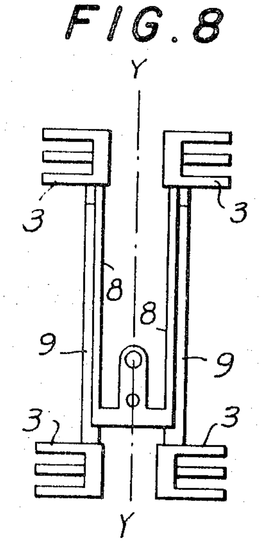

In the embodiment of FIG. 8, there are four units 3 forming each a part of an electro-dynamic transducer, two of which are each secured to the free end of one of the flexible limbs 8, and two of which are each secured to the free end of one of the rigid arms 9.

These units serve to maintain oscillations of the oscillator and to counterbalance themselves.

Finally, so far as ease of manufacture is concerned (Point 7), the embodiments of FIGS. 3 to 6, in which the "counterbalancing" parts are separately formed and mounted on the oscillating portion, are those that best satisfy the stated condition. In actuality, due to the fact these two parts can be treated differently, e.g. processes of manufacure, machining, heat treatment, etc., the more expensive treatments which are calculated to fulfill the most severe requirements in respect of accuracy and small tolerence, may be applied to the oscillating portion, whereas conventional and inexpensive processes are usually adequate for the manufacture of the "counterbalancing" parts of the oscillator.

Figure 9:
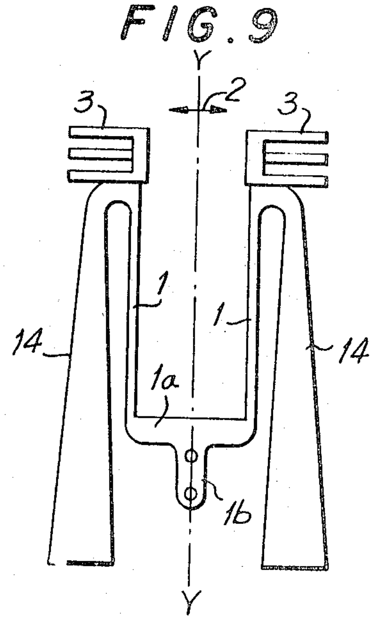

In a further embodiment of the invention as shown in FIG. 9 the counterbalance portions on the rigid arms are obtained by extending the arms 14 beyond the ends of the flexible arms. In order to avoid the need for too great an extension of the rigid arms, the latter can be made of a high density metal and can be tapered so as to increase in thickness in a direction away from the transducer.

What is claimed is:

1. In a flexure-type symmetrical oscillator, for an electric timepiece, a U-shaped part including two flexible limbs adapted to flex in the fashion of a tuning fork, and two rigid arms serving as counterbalances for the flexible limbs, said rigid arms being connected to respective flexible limbs adjacent the free ends of the latter and projecting therefrom parallel to said limbs along the complete length thereof and beyond the closed end of the U-shaped part to form arm and limb units in a symmetrical arrangement, each arm and limb unit having an instantaneous center of rotation during flexure, said unit being dimensioned to have a center of gravity which is substantially coincident with the instantaneous center of rotation whereby the frequency of the oscillator is substantially independent of changes of postion and orientation of such oscillator with respect to the field of gravity.

2. In an oscillator as claimed in claim 1 comprising electro-dynamic transducer means for driving said oscillator secured to each of the said flexible limbs at the free end thereof, and a counterbalance mass connected to each said rigid arm.

3. In an oscillator as claimed in claim 1 comprising electro-dynamic transducer means for driving the oscillator secured to each of the rigid arms, at the free end thereof opposite the end connected to the flexible limbs, and a counterbalance mass carried by each of the flexible limbs, at the free end thereof.

4. In an oscillator as claimed in claim 1 comprising electro-dynamic transducer means for driving the oscillator secured to each of said flexible limbs, at the free end thereof, and a second electro-dynamic transducer means both for driving the oscillator and for counterbalancing the first said transducer means, the second transducer means being connected to each of the rigid arms, at the free end thereof.

5. An oscillator as claimed in claim 1, in which the flexible limbs and the rigid arms are integral.

6. An oscillator as claimed in claim 1, in which the rigid arms are separate elements connected to the flexible limbs.

7. An oscillator as claimed in claim 1, in which each flexible limb and the associated rigid arm are connected by attachment of the free end of the former and one end of the latter.

8. An oscillator as claimed in claim 1, in which the flexible limbs and the rigid arms are respectively made of different materials, so as to permit thermal compensation in the oscillator.

9. An oscillator as claimed in claim 1, in which the flexible limbs and the rigid arms are located in a common plane.

10. An oscillator as claimed in claim 1, in which the flexible limbs and the rigid arms are disposed in two distinct parrallel planes.

11. An oscillator as claimed in claim 2 wherein the counterbalance masses are formed by the portions of the rigid arms which extend beyond the closed end of the U-shaped part.

References Cited

UNITED STATES PATENTS 3,277,394 10/1966 Holt et al. ---------- 58—23

RICHARD B. WILKINSON, Primary Examiner

E. C. SIMMONS, Assistant Examiner

U.S. Cl. X.R.

84—457